(12) United States Patent
Lee et al.

(10) Patent No.: US 8,838,798 B2
(45) Date of Patent: Sep. 16, 2014

(54) SYSTEM AND METHOD FOR MANAGING RESOURCE IN COMMUNICATION SYSTEM

(75) Inventors: Dong-Hun Lee, Daejeon (KR); Hyunduk Kang, Gwangju (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 106 days.

(21) Appl. No.: 13/289,343

(22) Filed: Nov. 4, 2011

(65) Prior Publication Data

US 2012/0117243 A1 May 10, 2012

(30) Foreign Application Priority Data

Nov. 4, 2010 (KR) ............... 10-2010-0109104
Nov. 4, 2010 (KR) ............... 10-2010-0109136
Nov. 3, 2011 (KR) ............... 10-2011-0114015

(51) Int. Cl.
*G06F 15/173* (2006.01)
*H04L 5/26* (2006.01)
*H04J 3/16* (2006.01)
*H04W 72/04* (2009.01)

(52) U.S. Cl.
CPC ............... *H04W 72/0453* (2013.01)
USPC ............... 709/226; 370/302; 370/464

(58) Field of Classification Search
CPC ............ H04L 29/08144; H04L 29/06; H04L 12/5695; H04W 72/0453
USPC ............... 370/302
See application file for complete search history.

(56) References Cited

U.S. PATENT DOCUMENTS

| 7,650,338 B2 * | 1/2010 | Grossfeld et al. ........ 707/999.01 |
| 8,385,286 B2 * | 2/2013 | Junell et al. .................. 370/329 |
| 2007/0223508 A1 | 9/2007 | Nandagopalan |
| 2008/0243799 A1 * | 10/2008 | Rozich et al. ..................... 707/3 |
| 2008/0259859 A1 * | 10/2008 | Cordeiro et al. .............. 370/329 |
| 2008/0263047 A1 * | 10/2008 | Yin et al. ........................... 707/9 |
| 2009/0080377 A1 * | 3/2009 | Ganguly et al. .............. 370/329 |
| 2011/0096770 A1 | 4/2011 | Henry |
| 2011/0116458 A1 | 5/2011 | Hsu et al. |
| 2011/0164581 A1 | 7/2011 | Keon |
| 2011/0250916 A1 * | 10/2011 | Li et al. ......................... 455/509 |

FOREIGN PATENT DOCUMENTS

| EP | 2129109 A2 * | 12/2009 | ............... H04N 5/44 |
| KR | 1020060060452 A | 6/2006 | |
| KR | 1020070048171 A | 5/2007 | |

OTHER PUBLICATIONS

Hyunduk Kang, et al; "Procedures and protocols, and coexistence mechanisms and algorithms proposal", IEEE P802.19, Nov. 10, 2010, 30 pages.

* cited by examiner

*Primary Examiner* — Oscar Louie
*Assistant Examiner* — Younes Naji
(74) *Attorney, Agent, or Firm* — Ladas & Parry LLP (57) ABSTRACT

Disclosed is a system for managing resources in a communication system including a plurality of systems not having permission a first frequency band, including: a coexistence manager managing the plurality of systems for coexistence and frequency sharing of the plurality of systems in available frequency bands when the available frequency bands by the plurality of systems are searched in the first frequency band; a coexistence enabler transmitting and receiving information of the plurality of systems and information of the coexistence manager; and a coexistence discovery and information server (CDIS) supporting a control of the coexistence manager for the plurality of systems.

16 Claims, 3 Drawing Sheets

SYSTEM AND METHOD FOR MANAGING RESOURCE IN COMMUNICATION SYSTEM

CROSS-REFERENCES TO RELATED APPLICATIONS

The present application claims priority of Korean Patent Application Nos. 10-2010-0109104, 10-2010-0109136, and 10-2011-0114015, filed on Nov. 4, 2010, Nov. 4, 2010, and Nov. 3, 2011, respectively, which are incorporated herein by reference in their entirety.

BACKGROUND OF THE INVENTION

1. Field of the Invention

Exemplary embodiments of the present invention relate to a communication system, and more particularly, to a system and a method for managing resources in a communication system so as to share a plurality of frequency resources in the communication system.

2. Description of Related Art

In a current communication system, research for providing services having various quality of services (hereinafter, referred to as 'QoS') to users at a high transmission rate has been actively conducted. In the communication system, research for providing large-capacity services having various QoSs using limited resources, for example, frequency resources has been actively conducted. In particular, due to a development of radio communication technologies and an introduction of new wireless communication services, there is a need to more efficiently use limited frequency resources.

As a method for increasing using efficiency of the limited frequency resources in the communication system, there has been provided methods for optimizing performance of a communication system, for example, methods for minimizing interference with other types of communication systems while maximizing spectral efficiency using multiple access, encoding, modulation, information compression, or the like and there has also been provided a frequency sharing method for increasing using efficiency of frequency resources by using available frequency bands among frequency bands used in advance like a TV band.

In this case, the frequency sharing in the available frequency bands among the frequency bands used in advance like the aforementioned TV band needs to use the available frequency bands without providing interference to a primary incumbent having preemptive permissions. Therefore, it is important to detect the available frequency bands by confirming whether the frequency band of the primary incumbent is used in the TV band. Further, when a plurality of different systems intending to use the available frequency bands detected in the TV band are present, there is a problem of coexistence for using the available frequency bands due to a difference in communication types, for example, wireless access types, among the plurality of different systems.

In other words, in the current communication system, when the plurality of different systems intending to use the available frequency bands detected in the TV band as described above are present, a detailed method for managing resources for allowing the plurality of different systems to efficiently use the detected available frequency bands are not present. In particular, methods for efficiently using frequency resources by coexistence of different communication types of systems so as to use the available frequency bands are not present.

Therefore, a need exists for a method for managing resources for efficiently using the detected available frequency bands by the coexistence of the plurality of different systems, for example, the different communication types of systems after detecting the available frequency bands among the frequency bands used in advance like the TV band in the communication system.

SUMMARY OF THE INVENTION

An embodiment of the present invention is directed to a system and a method for managing resources in a communication system.

Further, an embodiment of the present invention is directed to a system and a method for managing resources so as to efficiently use frequency bands among frequency bands used in advance in a communication system by coexistence of a plurality of systems.

In addition, an embodiment of the present invention is directed to a system and a method for managing frequency resources so as to use available frequency bands in a TV band by coexistence of a plurality of systems in a communication system.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with an embodiment of the present invention, a system for managing resources in a communication system including a plurality of systems not having a right to use a first frequency band, including: a coexistence manager managing the plurality of systems for coexistence and frequency sharing of the plurality of systems in available frequency bands when the available frequency bands by the plurality of systems are searched in the first frequency band; a coexistence enabler transmitting and receiving information of the plurality of systems and information of the coexistence manager; and a coexistence discovery and information server (CDIS) supporting a control of the coexistence manager for the plurality of systems, wherein coexistence manager is present in plural corresponding to each of the plurality of systems, and a first coexistence manager in the plurality of coexistence managers identifies the available frequency bands to allocate the operating channel of the plurality of systems based on channel information of the available frequency bands and channel information of neighbor coexistence managers.

In accordance with another embodiment of the present invention, a method for managing resources of a first frequency band in a communication system including a plurality of systems not having permission for a first frequency band, including: acquiring channel information of the available frequency band from a TVWS data base (TVWS DB) providing the channel information of the available frequency band when the available frequency bands by the plurality of systems are searched in the first frequency band; acquiring channel information of neighbor coexistence managers in a plurality of coexistence managers for coexistence and frequency sharing of the plurality of systems in the available frequency bands; and allocating operating channels of the plurality of systems by identifying the available frequency bands based on channel information of the available frequency bands and channel information of the neighbor coexistence managers.

DESCRIPTION OF SPECIFIC EMBODIMENTS

Exemplary embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

Embodiments of the present invention propose a system and a method for managing resources capable of detecting available frequency bands, for example, idle frequency bands (white space) (hereinafter, referred to as 'WS') among frequency bands used in advance like a TV band in a communication system, for example, a cognitive radio (hereinafter, referred to as 'CR') system, IEEE 802.19 based system, or IEEE 802.22 based system and effectively using the detected available frequency bands. Here, the embodiments of the present invention describe, by way of example, the CR system and the IEEE 802.19 and IEEE 802.22 based systems, but the method for managing resources proposed in the embodiments of the present invention may be applied to other communication systems.

In addition, the embodiments of the present invention describe a system and a method for managing resources so as to use available frequency bands in a TV band by coexistence of a plurality of different systems in a communication system. Here, the embodiments of the present invention provide the coexistence of each object of the system for managing resources for providing the sharing of the available frequency bands in the communication system and provide the coexistence of a plurality of different systems, in particular, systems using different communication types, for example, a wireless access type so as to share the available frequency bands among the frequency bands used in advance like a TV band, thereby improving the using efficiency of the frequency resources.

That is, the embodiments of the present invention allows the system for managing resources for the coexistence and the frequency sharing among the plurality of different systems in the communication system to share the available frequency bands, thereby improving the using efficiency of the limited frequency resources. Here, the embodiments of the present invention share the frequency in the available frequency bands among the frequency bands used in advance like the TV band. In this case, the embodiments of the present invention need to use the available frequency bands without providing interference to a primary incumbent having preemptive permission for the TV band. To this end, the embodiments of the present invention detect the available frequency bands by confirming whether the primary incumbent uses the frequency bands in the TV band and select and use an operating channel in the detected available frequency bands through the coexistence and the frequency sharing of the plurality of difference systems wanting to use the available frequency bands detected in the TV band.

In other words, in the embodiments of the present invention, the system for managing resources for the coexistence and the frequency sharing between a plurality of different systems in the communication systems allows predetermined objects for efficient coexistence to select the operating channel in the WS. In this case, the embodiments of the present invention classify the available channels in the WS for effectively selecting the operating channel in the WS to allocate the channel. Here, the system for managing resources in a communication system in accordance with the embodiments of the present invention will be described in more detail with reference to FIG. 1.

Figure 1:
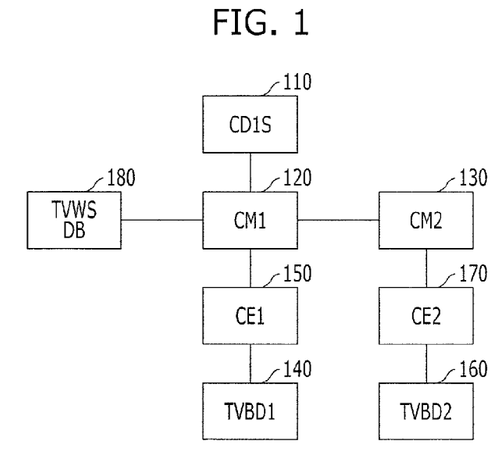
FIG. 1 is a diagram schematically illustrating a structure of a system for managing resources in a communication system in accordance with an exemplary embodiment of the present invention.

FIG. 1 is a diagram schematically illustrating a structure of a system for managing resources in a communication system in accordance with an embodiment of the present invention.

Referring to FIG. 1, when the plurality of different systems intends to use the available frequency bands among the frequency bands used in advance like the TV band, the system for managing resources includes devices intending to use the available frequency bands by the frequency sharing in the plurality of different systems, for example, TV band device (hereinafter, referred to as 'TVBD') 1 140 and TVBD2 160, coexistence managers (hereinafter, referred to as 'CM') managing the TVBDs 140 and 160 for improving the frequency sharing efficiency between the TVBDs 140 and 160, for example, CM1 120 and CM2 130, coexistence enablers (hereinafter, referred to as 'CE') included in the TVBDs 140 and 160 or independently located to serve as a passage between the TVBDs 140 and 160, for example, CE1 140 and CE2 170, a server supporting a control of the TVBDs 140 and 160 of the CMs 120 and 130, for example, a coexistence discovery and information server (hereinafter, referred to as 'CIDS'), and a TVWS data base 180 (hereinafter, referred to as 'TVWS DB') providing the available bands in the TV band, that is, channel information on the TVWS.

As described above, the TVBDs 140 and 160 mean devices of the plurality of different frequency bands, that is, secondary systems allowing other users (hereinafter, referred to as a 'secondary system') not having the preemptive permissions for the TV band to detect and use the predetermined frequency bands as the available frequency bands in the TV band when the primary incumbent (hereinafter, referred to as a 'primary system') having the preemptive permissions for the TV band does not use the predetermined frequency bands in the TV band, Here, the TVBDs 140 and 160 share and use the predetermined frequency bands through the coexistence and the frequency sharing so as to more efficiently use limited frequency resources. That is, the TVBDs 140 and 160 are allocated with the channel from the TVWS to transmit and receive data.

As described above, the CEs 150 and 160 are independently located in the TVBDs 140 and 160 to transmit and receive the information of the TVBDs 140 and 160 and the information of the CMs 120 and 130. Here, for convenience of explanation, the embodiments of the present invention mainly describe that the CEs 150 and 160 are independently present in the TVBDs 140 and 160, but the CEs 150 and 160 may be included in the TVBDs 140 and 160 or the CMs 120 and 130.

In addition, the CEs 150 and 160 extract context information associated with the corresponding TVBDs 140 and 160 requested by each of the CMs 120 and 130, for example, information such as a wireless access type, transmission power, a spectral sensing threshold value, and position, or the like, of the TVBDs 140 and 160 from the TVBDs 140 and 160 and transmit the extracted context information to the CMs 120 and 130. That is, the CEs 150 and 160 acquire the communication related information of each system as the context information on different secondary systems and transmits the acquired information to the CMs 120 and 130.

Further, the CEs 150 and 160 receive a request of the CMs 120 and 130 for managing the TVBDs 140 and 160, for example, a request of the context information and the configuration of the TVBDs 140 and 160 and update the context information of the TVBDs 140 and 160 and reset and reconfigure of the configuration of the TVBDs 140 and 160, according to the request. In other words, the CEs 150 and 160 receive the changed information of the context information, that is, the event information of the TVBDs 140 and 160 as the request of the context information of the TVBDs 140 and 160 and update the context information of the TVBDs 140 and 160 according to the event information. In addition, the CEs 150 and 160 receive the resetting of the components of the TVBDs 140 and 160 as the request of the configuration of the TVBDs 140 and 160 and reset, that is, reconfigure the components of the TVBDs 140 and 160 according to the resetting of the components.

The CMs 120 and 130 determines operation frequency allocation, transmission power allocation, transmission time allocation, or the like, so as to improve the frequency sharing efficiency between the TVBDs 140 and 160. In other words, the CMs 120 and 130 perform the operation frequency allocation, the transmission power allocation, and the transmission time allocation of the TVBDs 140 and 160 in the available frequency bands so as to improve the frequency sharing efficiency between the TVBDs 140 and 160 for the available frequency bands in the above-mentioned TV band.

Here, the CMs 120 and 130 perform the operation frequency allocation, the transmission power allocation, and the transmission time allocation of the corresponding TVBD in the available frequency bands by transmitting and receiving the information, for example, the context information and the event information of the TVBDs to and from the CMs, for example, neighbor CMs of the TVBDs that do not correspond to the CMs 120 and 130, so as to more improve the frequency sharing efficiency between the TVBDs 140 and 160. In this case, the CMs 120 and 130 acquire the context information and the event information of the TVBDs that do not correspond to the CMs 120 and 130 by directly transmitting and receiving to and from other CMs (for example, neighbor CMs) or transmitting and receiving to and from other CMs through a CDIS 110. Further, the CMs 120 and 130 acquire the information on the use of spectrum in the primary system through the external data base, for example, the TVWS DB 180, that is, the channel information on the available channels in the TV band or request the component resetting of the TVBDs corresponding to the CMs 120 and 130 to other CMs.

As described above, the CDIS 110 supports the control operation of the CMs 120 and 130 for sharing the frequency of the TVBDs 140 and 160 for the available frequency bands in the TV band. That is, the CDIS 110 receives and stores the context information and the event information of the TVBDs 140 and 160 from the CMs 120 and 130 and transmits the context information and the event information of the TVBDs 140 and 160 to the CMs 120 and 130 according to the request of the CMs 120 and 130. Further, the CDIS 110 acquires and stores the information on the use of spectrum, that is, the channel information on the available channel in the TV band in the primary system through the external data base, for example, the TVWS DB 180.

The TVWS DB 180 provides the channel information on the available channel in the TVWS to the CMs 120 and 130, wherein the channel information is provided to only the TVBDs that are registered in the TVWS DB 180 and have the authorized identification number.

The system for managing resources in the communication system in accordance with the embodiments of the present invention includes the TVWS DB 180, the CDIS 110, the CMs 120 and 130, and the CEs 140 and 160 so as to allow the available frequency band among the frequency bands used in advance in the primary system like the TV band to share and use the secondary system, that is, provide the coexistence and the frequency sharing of the TVBDs 140 and 160. Here, as described above, the TVBDs 140 and 160, which are devices of the secondary systems for sharing and using the available frequency bands, may be a base station (BS) (hereinafter, referred to as 'BS'), access point (AP) (hereinafter, referred to as 'AP'), a service access point (SAP) (hereinafter, referred to as 'SAP'), a terminal, or the like. In addition, as described above, the secondary systems, which are the plurality of different systems for sharing the available frequency bands, may be different communication types of systems, for example, IEEE 802.19 based system, IEEE 802.22 based system, or the like.

Further, the system for managing resources in the communication system in accordance with the embodiments of the present invention classifies the available channel in the TV band and then, allocates the available channel to be used by the TVBDs 140 and 160 to select the operating channel in the TVWS so as to provide the coexistence and the frequency sharing of the TVBDs 140 and 160 for the available frequency bands among the frequency bands used in advance. That is, the system for managing resources for the coexistence and the frequency sharing between the plurality of different systems allows the predetermined objects for efficient coexistence, for example, the CMs 120 and 130 to select the operating channel in the TVWS. In this case, the system for managing resources for the coexistence and the frequency sharing between the plurality of different systems classifies the available channel in the TVWS and allocates the channel so as to efficiently select the operating channel in the TVWS.

Here, the system for managing a frequency selects/allocates the operating channel by using an individual TV channel allocation type, a shared TV channel allocation by TVBD of same/similar type, a shared TV channel allocation by TVBD of dissimilar type, or the like, when the plurality of systems for coexistence, for example, the operating channel of the TVBDs are selected since the number of systems to be coexistence is larger than the number of available channels in the corresponding region through the frequency sharing at the time of the coexistence of the plurality of systems.

The individual TV channel allocation type is a type of adaptively allocating different channels to each TVBD. Therefore, the individual TV channel allocation type does not cause the spectrum overlapping between the TVBDs and thus, does not cause the interference. Therefore, the individual TV channel allocation type supports the existence of the TVBEs by appropriately allocating the TV channel to the TVBDs. Further, the shared TV channel allocation by TVBD of same/similar type is a type in which two or more same TVBDs, that is, the TVBDs using the same wireless access type share the same TV channel. In this case, the shared TV channel allocation by TVBD of same/similar type may allocate two or more TV channels to the same TVBDs so as to be shared. Here, when sharing the TV channel between same TVBDs, the interference occurring between the same TVBDs is reduced by using a self-coexistence algorithm. For example, the same TVBDs, that is, two or more IEEE 802.22 systems as the same system use the self-coexistence algorithm such as on-demand frame contention (hereinafter, referred to as 'ODFC') to share the channel between IEEE 802.11 systems. Further, the shared TV channel allocation by TVBD of dissimilar type, which is a type of allowing two or more dissimilar TVBDs, that is, the TVBDs using the different wireless access types to share the same TV channel, uses the coexistence algorithm between the dissimilar systems to minimize the interference occurring between the dissimilar TVBDs.

Further, the system for managing a frequency selects the operating channel to be used by the CM for the coexistence and the frequency sharing of the plurality of systems, that is, selects the operating channel by classifying the available channel in the TVWS and then, allocating the channels among the classified available channels. In this case, the system for managing a frequency classifies the idle channel, that is, the available channel in the TV band by using the registered TVBD information and allocates the operating channel to the plurality of systems in the classified channel. Here, the case in which the CM of the system for managing resources in a communication system in accordance with the embodiment of the present invention classifies the available channel in the TV band will be described in more detail.

Figure 2:
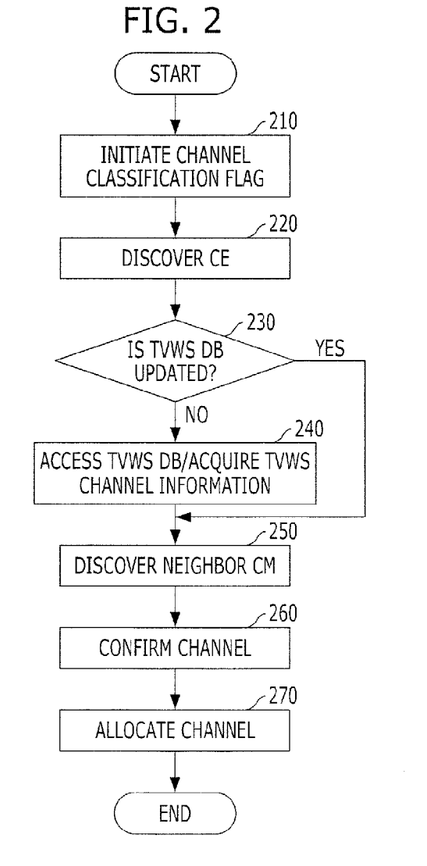
FIG. 2 is a diagram schematically illustrating a channel classification operation of the system for managing resources in a communication system in accordance with an exemplary embodiment of the present invention.

FIG. 2 is a diagram schematically illustrating a channel classification operation of the system for managing resources in a communication system in accordance with an exemplary embodiment of the present invention. Here, the system for managing resources determines the type of the TVBDs in the TVWS and the channel allocation according to whether the channel is used in the neighbor CMs and performs the channel classification in the TVWS for the efficient coexistence and frequency sharing as illustrated in FIG. 2.

Referring to FIG. 2, at S210, the CM of the system for managing resources initializes a channel classification flag for channel classification in the TVWS. That is, the CM resets the channel classification flag. In this case, the CM resets the Initiate_Channel_Classification flag to '0'.

Then, at S220, the CM discovers, that is, confirms the CEs registered in the CM. In this case, the CM sets an Initiate_Registered_CE_Discovery flag to '1' to discover the registered CEs.

Next, at S230, it is checked whether the TVWS DB providing the channel information on the available channel in the TVW is updated to recent channel information. As the check result at S230, when the TVWS DB is updated, the CMs neighbor to the CM, that is, the neighbor CMs are discovered at S250. Here, the case in which the TVWS DB is updated corresponds to the case in which the CM acquires the channel information of the available channel in the TVWS updated from the TVWS DB. In this case, when the TVWS DB is updated, a TVWS_Channel_Update flag is set to '1'. When the TVWS_Channel_Update flag is set to '1', the CM resets the TVWS_Channel_Update flag to '0' and then, sets an Initiate_Neighbor_CM_Discovery flag at S250 to discover, that is, confirm the neighbor CMs.

Meanwhile, as the check result at S230, when the TVWS DB is not updated, after accessing the TVWS DB at S240, the channel information of the available channel is acquired in the TVWS from the TVWS DB. Here, when the TVWS DB is not updated, the TVWS_Channel_Update flag is set to '0'. As described above, when the TVWS_Channel_Update flag is set to '0', the CM acquires the channel information by accessing the TVWS DB. In this case, when the channel information is not acquired for the preset predetermined time, the CM transmits the message to the CEs registered in the CM to allow the CEs to transmit a disconnection request message to the CM.

At S240, the CM acquiring the channel information of the available channel in the TVWS from the TVWS DB sets the Initiate_Neighbor_CM_Discovery flag at S250 as described above to discover, that is, confirm the neighbor CMs.

Then, at S260, the CM confirms/identifies the available channel, that is, performs the channel identification in the TVWS from the channel information and sets the Initiate_Channel_Allocation flag at S270 to allocate the available channel to the plurality of systems, that is, the TVBEs.

As described above, the CM of the system for managing resources in a communication system in accordance with the embodiment of the present invention discovers the CEs registered in the CM like at S220 for classifying the available channel in the TVWS and acquires the channel information on the available channel in the TVWS from the TVWS DB like 5230 and then, discovers the neighbor CMs at S250 and confirms and identifies the channel at S260 to classify the channel. In other words, the CM of the system for managing resources needs to receive the channel information of the available channel in the TVWS from the TVWS DB as described above so as to classify the available channel in the TVWS. In this case, as described above, the TVWS DB provides the channel information to only the TVBDs of which the identification number is authorized such that the CM requests the related information and measuring information of the CE including the identification number to the CE registered in the CM to the CE.

First, the TVWS DB transmits the channel information of the available channel in the TVWS to the CM as described above, wherein the channel information may be represented by the following Tables 1 and 2. Here, Table 1 is a table representing a header and a payload of the message including the channel information of the available channel in the TVWS, that is, the available TVWS channel information and Table 2 is a table representing a data type of the message including the available TVWS channel information.

TABLE 1

| Information element | Data type | Description |
|---|---|---|
| Header | | |
| sourceIdentifier = CE_ID or TVWSDB_ID | CX_ID | Source identifier |
| destinationIdentifier = CM_ID | CX_ID | Destination identifier |
| ACKPolicy | BOOLEAN | Request to send an acknowledgement of reception |
| Payload | | |
| listOfAllowed-TVWSChNumber | ListOfAllowed-TVWSChNumber OPTIONAL | Allowed TVWS channel number list |
| constOfChUses | ConstOfChUses OPTIONAL | Channel user constraint |

TABLE 2

```
ConstOfChUseID :: = ENUMERATED{
    regulationMaxTxPower,
    regulationMaxAntGain,
    regulationMaxAntHeight,
    regulationTVDBUpdateTime,
    OutOfBandEmissionLimit,
    ...
}
ConstOfChUseValue :: = CHOICE{
    regulationMaxTxPower            REAL,
    regulationMaxAntMaxGain         REAL,
    regulationAntMaxHeight          REAL,
    regulationTVDBUpdateTime        REAL,
    OutOfBandEmissionLimit          REAL,
    ...
}
ConstOfChUse : : = SEQUENCE{
    constOfChUseID          ConstOfChUseID,
    constOfChUseValue       ConstOfChUseValue
}
ConstOfChUses : : = SEQUENCE OF ConstOfChUse
```

Further, as described above, the CM requests the measuring information to the CEs so as to discover the CEs registered in the CM and the CEs transmits the measuring information as a response to the measuring information request of the CM. Here, the measuring information includes the information such as the wireless access type, the transmission power, the spectrum sensing threshold value, and the position of the TVBDs, or the like, that is, the context information associated with the TVBDs. In addition, Table 3 is a table representing the header and the payload of the request message requesting the measuring information, Table 4 is a table representing the data type of the request message, Table 5 is a table representing the header and the payload of the response message including the measuring information, and Table 6 is a table representing the data type of the response message.

TABLE 3

| Information element | Data type | Description |
|---|---|---|
| Header | | |
| sourceIdentifier = CM_ID | CX_ID | Source identifier |
| destinationIdentifier = CE_ID | CX_ID | Destination identifier |
| ACKPolicy | BOOLEAN | Request to send an acknowledgement of reception |
| Payload | | |
| Measurement Description | Measurement Description | Measurement description |

TABLE 4

```
MeasSchedule ::= SEQUENCE {
    measStartTime               REAL,
    numberOfMeasurements        INTEGER,
    timeBetweenMeasurements     REAL
}
MeasFreq ::= SEQUENCE {
    maeasStartFreq              REAL OPTIONAL,
    measEndFreq                 REAL OPTIONAL,
    listOfChNumber              SEQUENCE OF INTEGER OPTIONAL
}
MeasurementDescription ::= SEQUENCE OF SEQUENCE{
    measDescr        ENUMERATED{SINR, BER, SensingLevel,
PrimaryDetection, TVBDDetection,
ChannelLoadMeasurement...},
    measSchedule        MeasSchedule,
    measFreq            MeasFreq
}
```

TABLE 5

| Information element | Data type | Description |
|---|---|---|
| Header | | |
| sourceIdentifier = CE_ID | CX_ID | Source identifier |
| destinationIdentifier = CM_ID | CX_ID | Destination identifier |
| ACKPolicy | BOOLEAN | Request to send an acknowledgement of reception |
| Payload | | |
| measurementResult | MeasurementResult | Measurement results |

TABLE 6

```
MeasurementResult ::= SEQUENCE OF SEQUENCE{
        reqInfoDescr ReqInfoDescr,
    reqInfoValue CHOICE{SINRValue REAL, BERValue
REAL,SensingLevelValue REAL, PrimaryDetection BOOLEAN,
TVBDDetection BOOLEAN, ChannelLoadMeasurement REAL,
otherValue ANY}
    }
```

Next, in order for the CM of the resource managing system to classify the available channel in the TVWS, the plurality of systems discovers the neighbor CMs so as to effectively implement the coexistence and the frequency sharing without degrading the performance. To this end, the CM needs the information on the channel in the TVWS that is used by all the TVBDs registered in the neighbor CM. Therefore, the CM requests the neighbor CM list and the TVBD information registered in the neighbor CMs to the CDIS and requests the TVBD information registered in the neighbor CMs to the neighbor CMs based on the TVBD information registered in the neighbor CMs. Further, the CM transmits the neighbor CM list received from the CDIS and the TVBD information registered in the neighbor CMs to the CEs. In this case, the CM discovers the neighbor CMs through the neighbor CM list received from the CDIS and the TVBD information registered in the neighbor CMs.

In this case, Table 7 is a table representing a header and a payload of a request message requesting the neighbor CM list and the TVBD information registered in the neighbor CMs to the CDIS by the CM and Table 8 is a table representing a header and a payload of a response message including the neighbor CM list and the TVBD information registered in the neighbor CMs transmitted to the CM from the CDIS.

TABLE 7

| Information element | Data type | Description |
|---|---|---|
| Header | | |
| sourceIdentifier = CM_ID | CX_ID | Source identifier |
| destinationIdentifier = CDIS_ID | CX_ID | Destination identifier |
| ACKPolicy | BOOLEAN | Request to send an acknowledgement of reception |
| Payload | | |
| listOfCEID | SEQUENCE OF CX_ID OPTIONAL | CE ID list |

TABLE 8

| Information element | Data type | Description |
|---|---|---|
| Header | | |
| sourceIdentifier = CDIS_ID | CX_ID | Source identifier |
| destinationIdentifier = CM_ID | CX_ID | Destination identifier |
| ACKPolicy | BOOLEAN | Request to send an acknowledgement of reception |
| Payload | | |
| Note: Information elements below are repeated for each TVBD network or device. | | |
| CEID | CX_ID | CE ID |
| Note: Information elements below are repeated for each neighbor CM | | |
| neighborCMID | CX_ID | Neighbor CM ID |
| Note: Information elements below are repeated for each neighbour TVBD network or device. | | |
| networkID | NetworkID | E.g., BSSID |
| networkTechnology | NetworkTechnology | E.g., 802.11af, 802.22 |
| interferenceDirection | InterferenceDirection | Mutual, source or victim |
| interferenceLevelFromNeighbor | REAL | Estimated worst case interference level caused by the neighbor |
| interferenceLevelToNeighbor | REAL | Estimated worst case interference level caused by the TVBD network or device for which neighbors are reported |
| NetworkGeometryClass | NetworkGeometryClass | Network geometry class between a TVBD network and its neighbour TVBD network(s) |

Further, Table 9 is a table representing a header and a payload of the request message requesting the TVBD information registered in the neighbor CMs to the neighbor CMs by the CM and Table 10 is a table representing a data type of a request message requesting the TVBD information registered in the neighbor CMs.

TABLE 9

| Information element | Data type | Description |
|---|---|---|
| Header | | |
| sourceIdentifier = CM_ID | CX_ID | Source identifier |
| destinationIdentifier = CE_ID or CM_ID | CX_ID | Destination identifier |
| ACKPolicy | BOOLEAN | Request to send an acknowledgement of reception |
| Payload | | |
| reqInfoDescr | ReqInfoDescr | ID of the requested information |

TABLE 10

ReqInfoDescr ::= SEQUENCE OF ENUMERATED{
    SINR,
    desiredBandwidth, TABLE 10-continued     desiredOccupancy,
    desiredQoS,
    desiredCoverage,
    channelNumber,
    . . .
}

Further, Table 11 is a table representing a header and a payload of the response message including the TVBD information registered in the neighbor CMs transmitted to the CM from the neighbor CMs and Table 12 is a table representing a data type of a response message including the TVBD information registered in the neighbor CMs.

TABLE 11

| Information element | Data type | Description |
|---|---|---|
| Header | | |
| sourceIdentifier = CE_ID or CM_ID | CX_ID | Source identifier |
| destinationIdentifier = CM_ID | CX_ID | Destination identifier |
| ACKPolicy | BOOLEAN | Request to send an acknowledgement of reception |
| Payload | | |
| reqInfoValue | ReqInfoValue | Requested information |

TABLE 12

ReqInfoValue ::= SEQUENCE OF SEQUENCE{
    reqInfoDescr  ReqInfoDescr,
    reqInfoValue  CHOICE{  SINRValue      REAL,
    desiredBandwidthValue      REAL,
                             desiredOccupancyValue  REAL,
    desiredQoSValue          REAL,
    desiredCoverageValue      REAL,
    channelNumberValue       REAL,
    otherValue      ANY}
}

In addition, the CM requests the neighbor CM list received from the CDIS and the TVBD information registered in the neighbor CM from the CE and as described above, the CM transmits the neighbor CM list received from the CDIS and the TVBD information registered in the neighbor CMs as the response to the request of the CE. Here, Table 13 is a table representing a header and a payload of a request message requesting the neighbor CM list and the TVBD information registered in the neighbor CM to the CM by the CE and Table 14 is a table representing a header and a payload of a response message including the neighbor CM list and the TVBD information registered in the neighbor CMs transmitted to the CE from the CM.

TABLE 13

| Information element | Data type | Description |
|---|---|---|
| Header | | |
| source Identifier = CE_ID | CX_ID | Source identifier |
| destinationIdentifier = CM_ID | CX_ID | Destination identifier |
| ACKPolicy | BOOLEAN | Request to send an acknowledgement of reception |
| Payload | | |
| None | | |

TABLE 14

| Information element | Data type | Description |
|---|---|---|
| Header | | |
| sourceIdentifier = CM_ID | CX_ID | Source identifier |
| destinationIdentifier = CE_ID | CX_ID | Destination identifier |
| ACKPolicy | BOOLEAN | Request to send an acknowledgement of reception |
| Payload | | |
| Note: Information elements below are repeated for each neighbor CM | | |
| neighborCMID | CX_ID | Neighbor CM ID |
| Note: Information elements below are repeated for each neighbor TVBD network or device. | | |
| networkID | NetworkID | E.g., BSSID |
| networkTechnology | NetworkTechnology | E.g., 802.11af, 802.22 |
| interferenceDirection | InterferenceDirection | Mutual, source or victim |
| interferenceLevelFromNeighbor | REAL | Estimated worst case interference level caused by the neighbor |
| interferenceLevelToNeighbor | REAL | Estimated worst case interference level caused by the TVBD network or device for which neighbors are reported |
| listOfOperatingChannelNumber | ListOfOperatingChannelNumber OPTIONAL | List of operating channel number |
| listOfOperatingFrequencies | ListOfOperatingFrequencies OPTIONAL | List of operating frequencies |
| radioEnvironmentInformation | RadioEnvironmentInformation OPTIONAL | Radio environment information |
| NetworkGeometryClass | NetworkGeometryClass | Network geometry class between a TVBD network and its neighbour TVBD network(s) |

The CM discovering the neighbor CMs identifies the available channel in the TVWS. In this case, the available channel in the TVWS has the different channel allocation types according to the type of the TVBD and whether the channel is used in the neighbor CMs and therefore, the CM identifies the operating channel in the TVWS, that is, confirms and classifies the available channel based on the channel information of the available channel in the TVWS acquired from the TVWS DB and the channel information used by all the neighbor TVBDs registered in the neighbor CMs. Further, the system for managing resources in a communication system in accordance with the embodiments of the present invention will describe an operation of confirming the available channel in the TVWS, that is, identifying the operating channel in the TVWS with reference to FIG. 3.

Figure 3:
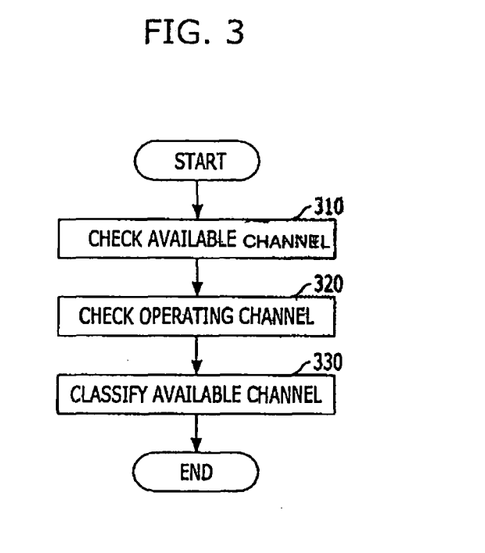
FIG. 3 is a diagram schematically illustrating a channel identification operation of the system for managing resources in a communication system in accordance with an exemplary embodiment of the present invention.

FIG. 3 is a diagram schematically illustrating the channel identification operation of the system for managing resources in a communication system in accordance with an exemplary embodiment of the present invention.

Referring to FIG. 3, at S310, the CM of the system for managing resources checks the available channel in the TVWS based on the channel information of the available channel in the TVWS acquired from the TVWS DB and the channel information used by all the neighbor TVBDs registered in the neighbor CMs as described above.

Then, at S320, the CM checks whether the available channel in the checked TVWS is the operating channel used by the TVBD registered in the neighbor CMs.

Next, at S330, the CM identifies the available channel in the checked TVWS into the available channel as the operating channel used by the TVBD registered in the neighbor CMs and the operating channel not used by the TVBD registered in the neighbor CMs. Next, the CM identifies a restricted channel in the checked TVWS into the restricted channel as the operating channel used by the TVBD registered in the neighbor CMs and the operating channel not used by the TVBD registered in the neighbor CMs. That is, the CM allows the TVBDs registered in the CM in the TVWS to classify the available channel. Further, the system for managing resources in a communication system in accordance with the embodiments of the present invention will describe in detail an operation of allocating the available channel in the TVWS, that is, allocating the operating channel in the TVWS with reference to FIG. 4.

Figure 4:
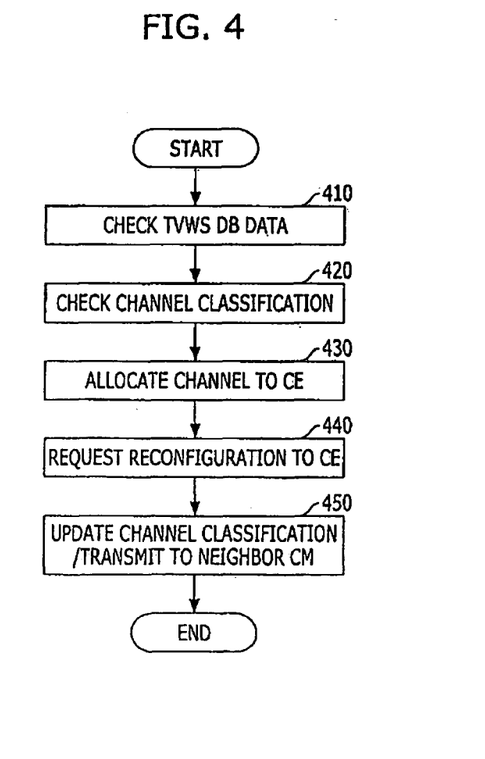
FIG. 4 is a diagram schematically illustrating a channel allocation operation of the system for managing resources in a communication system in accordance with an exemplary embodiment of the present invention.

FIG. 4 is a diagram schematically illustrating a channel allocation operation of a system for managing resources in a communication system in accordance with an exemplary embodiment of the present invention.

Referring to FIG. 4, at S410, the CM of the system for managing resources checks whether the updated channel information data of the TVWS DB providing the channel information on the available channel in the TVWS is valid so as to allocate the available channel in the TVWS as described above. In this case, when the updated channel information data of the TVWS DB is not valid, as described in FIG. 2, the CM accesses the TVWS DB to perform the channel information update of the TVWS DB. Meanwhile, the channel information update of the TVWS DB is described in detail in FIG. 2 and therefore, the detailed description thereof will be omitted.

Further, at S420, the CM checks the channel classification of the available channel in the TVWS as described in FIG. 3. In this case, the CM resets the Initiate_Channel_Allocation flag to '0' to check the channel classification of the available channel in the TVWS.

Then, at S430, the CM allocates the available channel in the channel classified TVWS to the CEs registered in the CM. As described above, the CM allocates the independent operating channel to each CE in the case of the individual TV channel allocation type. Further, when the CM is not the individual TV channel allocation type, the CM updates the channel classification of the available channel in the TVWS by performing the negotiation with the neighbor CMs when the negotiation with the neighbor CMs is required and determines the channel unique type of the CEs registered in the CM when the negotiation with the neighbor CMs is not required to select the operating channel, that is, allocate the channel. Here, the available channel in the TVWS has the different channel allocation type according to the type of the TVBD and whether the channel is used in the neighbor CMs and therefore, the CM selects the operating channel of the CEs registered in the CM based on the channel information of the available channel in the TVWS received from the TVWS DB and the operating channel information of all the neighbor TVBDs registered in the neighbor CMs.

Next, at S440, the CM requests reconfiguration to the CEs registered in the CM and confirms whether the reconfiguration of the registered CEs is successfully performed corresponding to the reconfiguration request. In this case, the CE that does not successfully perform the reconfiguration does not allocate the channel.

As described above, at S450, the CM updates the channel classification corresponding to the channel allocation to the registered CEs and transmits the channel classification information on the updated channel classification to the neighbor CMs. In this case, the CM sets an Initiate_Registered CM_Channel_Classificaiton_Discovery flag to '1' to update the channel classification and transmits the updated channel classification information to the neighbor CMs.

As described above, the CM confirms whether the resetting is successfully performed corresponding to the reconfiguration request to the CEs registered in the CM. In this case, the registered CEs transmits the reconfiguration related information to the CM as the response to the reconfiguration request. That is, the CM receives the reconfiguration response message including the reconfiguration related information as the response to the reconfiguration request from the registered CEs and confirms whether the reconfiguration of the registered CEs is successfully performed through the reconfiguration related information included in the reconfiguration response message. Further, Table 15 is a table representing a header and a payload of the reconfiguration response message including the reconfiguration related information and Table 16 is a table representing the data type of the reconfiguration response message.

TABLE 15

| Information element | Data type | Description |
| --- | --- | --- |
| Header | | |
| sourceIdentifier = CE_ID | CX_ID | Source identifier |
| destinationIdentifier = CM_ID | CX_ID | Destination identifier |
| ACKPolicy | BOOLEAN | Request to send an acknowledgement of reception |
| Payload | | |
| status | BOOLEAN | Status: successful or not |
| failedParameters | FailedParameters OPTIONAL | Failed reconfiguration parameters with recommended values of parameters if reconfiguration request from CM to TVBD is failed |

TABLE 16

```
FailedParameterID : : = ENUMERATED {
    operatingFrequency,
    listOfoperatingChNumber,
    txPowerLimit,
    channelIsShared,
    txSchedule,
}
FailedParameterValue : : = CHOICE{
    operatingFrequency      SEQUENCE{startFeq REAL,
stopFreq REAL},
    listOfoperatingChNumber   SEQUENCE OF INTEGER,
    txPowerLimit            REAL,
    channelIsShared         BOOLEAN,
    txSchedule              SEQUENCE OF TxSchedule OPTIONAL
}
FailedParameter : : = SEQUENCE{
failedParameterID       FailedParameterID,
failedParameterValue    FailedParameterValue
}
FailedParameters : : = SEQUENCE OF FailedParameter
```

Figure 5:
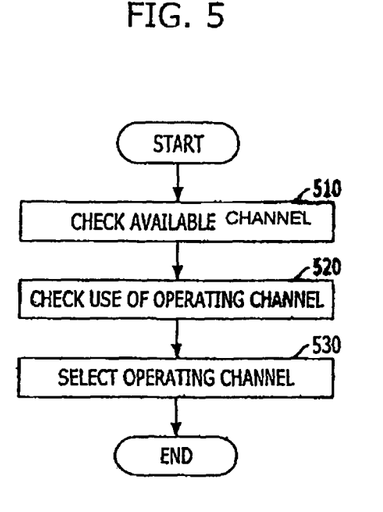
FIG. 5 is a diagram schematically illustrating a channel select operation of the system for managing resources in a communication system in accordance with an exemplary embodiment of the present invention.

Further, the system for managing resources in a communication system in accordance with the embodiments of the present invention will describe in detail an operation of selecting the available channel in the TVWS, that is, selecting the operating channel in the TVWS with reference to FIG. 5.

FIG. 5 is a diagram schematically illustrating a channel select operation of the system for managing resources in a communication system in accordance with an exemplary embodiment of the present invention.

Referring to FIG. 5, at S510, the CM of the system for managing resources checks the available channel in the TVWS and at S520, checks the use as the available channel in the available channel of the TVWS and then, at S530, selects and allocates the available channel as the operating channel.

In this case, when the available channel is present in the TVWS, the CM is selected as the operating channel and when the available channel is not present, the restricted channel is checked in the TVWS. In this case, the CM allows the same TVBD to checks the channels used as the operating channel in the TVBDs registered in the neighbor CMs when the restricted channel is present in the TVWS, the corresponding TV selects the restricted channel and the available channel as the operating channel, and the restricted channel is not present or the corresponding TVBD cannot use the restricted channel. In this case, the CM selects the channel used as the operating channel by the same TVBD as the operating channel and checks the channel used as the operating channel by the dissimilar TVBD in the TVBDs registered in the neighbor CMs when the channel used as the operating channel by the same TVBD is not present. In this case, the CM selects as the operating channel the channel used as the operating channel by the dissimilar TVBD. In this case, when the channel used as the operating channel by the dissimilar TVBD is not present, the CM informs the TVBDs registered in the CM that the operating channel is not present.

The system for managing resources in a communication system in accordance with the embodiment of the present invention effectively selects and allocates the operating channel by adaptively selecting the channel use in the TVWS of the TVBDs registered in the CM and the operating channel of the TVBDs registered in the CM according to the number of available channels in the TVWS and whether the TVWS is used in the neighbor CM to allow the plurality of systems in the TVWS to efficiently perform the coexistence and the frequency sharing. In particular, the CM of the system for managing resources identifies the channel according to the channel characteristics to efficiently classify the channel so as to select the operating channel in the WS band, thereby adaptively selecting the operating channel according to the system environment of the plurality of systems. Further, the CM of the system for managing resources allocates the operating channel according to the number of available channels in the TVWS and the neighbor systems, that is, the number of neighbor CMs to effectively allocate the channel so as to select the operating channel in the WS band, thereby adaptively selecting the operating channel according to the system environment of the plurality of systems.

In accordance with the embodiments of the present invention, the plurality of systems coexist in the communication system to manage the frequency resources so as to use the available frequency bands among the frequency bands used in advance like a TV band, thereby more effectively using the limited frequency resources to improve the using efficiency of the frequency resources.

While the present invention has been described with respect to the specific embodiments, it will be apparent to those skilled in the art that various changes and modifications may be made without departing from the spirit and scope of the invention as defined in the following claims.

What is claimed is:

1. A system for managing resources in a communication system including a plurality of systems not having permission for a first frequency band, comprising:
a memory;
a processor coupled to the memory configured to execute programmed instructions stored in the memory comprising:
a coexistence manager managing the plurality of systems for coexistence and frequency sharing of the plurality of systems in available frequency bands when the available frequency bands by the plurality of systems are searched in the first frequency band;
a coexistence enabler transmitting and receiving information of the plurality of systems and information of the coexistence manager, wherein the information of the plurality of systems includes wireless access type, transmission power, spectral sensing threshold value, and position; and
a coexistence discovery and information server (CDIS) supporting a control of the coexistence manager for the plurality of systems, wherein the coexistence manager is present in plural corresponding to each of the plurality of systems, and
a first coexistence manager in the plurality of coexistence managers identifies the available frequency bands to allocate an operating channel of the plurality of systems based on channel information of the available frequency bands and channel information of neighbor coexistence managers, wherein the first coexistence manager allocates the operating channel by classifying the available frequency bands of the neighbor coexistence managers in classes including individual TV channel allocation type, shared TV channel allocation by television band device (TVBD) of same wireless access type, and shared TV channel allocation by TVBD of dissimilar wireless access type, and wherein the first coexistence manager receives the channel information of neighbor coexistence managers in response to at least one request by the first coexistence managers to the neighbor coexistence managers for the channel information of the neighbor coexistence managers, including TVBD Information of each TVBD registered in each respective neighbor coexistence manager, and wherein allocation of systems to classes, including the individual type, the shared same type, and the shared dissimilar type Is based upon providing efficient coexistence of the systems among the available frequency bands.

2. The system for managing resources of claim 1, further comprising a TVWS database (TVWS DB) providing channel information of the available frequency bands, wherein the first coexistence manager accesses the TVWS database to acquire the channel information of the available frequency bands from the TVWS database.

3. The system for managing resources of claim 2, wherein the TVWS database includes a header, a payload, and a data type and transmits the message including the channel information of the available frequency band to the first coexistence manager.

4. The system for managing resources of claim 2, wherein the first coexistence manager discovers the neighbor coexistence manager from the coexistence enabler registered in the first coexistence manager.

5. The system for managing resources of claim 2, wherein the first coexistence manager transmits a request message requesting measuring information including context information of the plurality of systems to a coexistence enabler registered in the first coexistence and receives a response message including the measuring information from the coexistence enabler registered in the first coexistence manager corresponding to the request message; the first coexistence manager discovers the coexistence enabler registered in the first coexistence manager through the measuring information; and the request message and the response message include the header, the payload, and the data type.

6. The system for managing resources of claim 4, wherein the first coexistence manager transmits a list of the neighbor coexistence manager and a first request message requesting information of the systems registered in the neighbor coexistence managers to the coexistence discovery and information server and receives a first response message including the list of the neighbor coexistence managers from the coexistence discovery and information server and information of the systems registered in the neighbor coexistence managers in response to the first request message; and the first coexistence manager discovers the neighbor coexistence managers through the list of the neighbor coexistence managers and the information of the systems registered in the neighbor coexistence managers; and the first request message and the first response message include a header and a payload.

7. The system for managing resources of claim 6, wherein the first coexistence manager transmits a second request message requesting the information of the systems registered in the neighbor coexistence managers to the neighbor coexistence managers and receives a second respond message including the information of the systems registered in the neighbor coexistence managers from the neighbor coexistence managers corresponding to the second request message; and the second request message and the second response message include a header, a payload, and a data type.

8. The system for managing resources of claim 7, wherein the first coexistence manager receives a third request message requesting the information of the systems registered in the neighbor coexistence manager from the coexistence enabler registered in the first coexistence manager and transmits a third response message including the information of the systems registered in the neighbor coexistence managers to the coexistence enabler registered in the first coexistence manager corresponding to the third request message; and the third request message and the third response message include a header and a payload.

9. The system for managing resources of claim 1, wherein the first coexistence manager is identified into a use channel of the plurality of systems and a use channel of the systems registered in the neighbor coexistence manager in the available frequency bands; is identified into a use channel of the systems registered in the neighbor coexistence managers in a restricted channel of the first frequency band; and selects and allocates the use channels as the operating channels of the plurality of systems.

10. The system for managing resources of claim 1, wherein the first coexistence manager transmits a reconfiguration request message requesting a reconfiguration to a coexistence enabler registered in the first coexistence manager and receives a reconfiguration response message from the coexistence enabler registered in the first coexistence manager corresponding to the reconfiguration request message; and the first coexistence manager confirms the reconfiguration of the coexistence enabler registered in the first coexistence manager through the reconfiguration response message to determine operation channel allocation; and the reconfiguration response message includes a header, a payload, and a data type.

11. A method for managing resources of a first frequency band in a communication system including a plurality of systems not having permission for a first frequency band, comprising:

acquiring channel information of the available frequency band from a TVWS data base (TVWS DB) providing the channel information of the available frequency band when the available frequency bands, by the plurality of systems are searched in the first frequency band;

acquiring channel information of neighbor coexistence managers in a plurality of coexistence managers for coexistence and frequency sharing of the plurality of systems in the available frequency bands; and allocating operating channels by classifying the available frequency bands of the neighbor coexistence managers in classes including individual TV channel allocation type, shared TV channel allocation by television band device (I-VBD) of same wireless access type, and shared TV channel allocation by TVBD of dissimilar wireless access type, wherein allocation of systems to classes, including the individual type, the shared same type, and the shared dissimilar type is based upon providing efficient coexistence of the systems among the available frequency bands.

12. The method for managing resources of claim 11, wherein the allocating of the plurality of systems includes: discovering the neighbor coexistence managers by receiving the list of the neighbor coexistence managers and the information of the systems registered in the neighbor coexistence managers; and discovering a coexistence enabler (CE) of the plurality of systems by receiving measuring information including context information of the plurality of systems.

13. The method for managing resources of claim 12, wherein the discovering of the coexistence enabler receives and discovers the measuring Information including the context information of the plurality of systems.

14. The method for managing resources of claim 12, wherein the allocating of the operating channels of the plurality of systems allocates the operating channels of the plurality of systems based on the channel information of the available frequency bands, the list of the neighbor coexistence managers, and the Information of the systems registered in the neighbor coexistence managers.

15. The method for managing resources of claim 14, wherein the allocating of the operating channels of the plurality of systems includes: identifying into a use channel of the plurality of systems and a use channel of the systems registered in the neighbor coexistence managers in the available frequency bands; identifying into the use channel of the systems registered in the neighbor coexistence managers in a restricted channel of the first frequency band; and selecting and allocating the use channels as the operating channels of the plurality of systems.

16. The method for managing resources of claim 15, wherein the allocating of the operating channels of the plurality of systems receives the reconfiguration information from the coexistence enabler and confirms the reconfiguration of the coexistence enabler through the reconfiguration information to determine the operation channel allocation of the plurality of systems.

\* \* \* \* \*